US012705293B2

(12) United States Patent
Wang et al.

(10) Patent No.: US 12,705,293 B2
(45) Date of Patent: Aug. 11, 2026

(54) DATA PROCESSING METHOD, APPARATUS, DEVICE AND STORAGE MEDIUM

(71) Applicant: Beijing Zitiao Network Technology Co., Ltd., Beijing (CN)

(72) Inventors: Qi Wang, Beijing (CN); Lan Liu, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/715,488

(22) PCT Filed: Jun. 6, 2023

(86) PCT No.: PCT/CN2023/098579
§ 371 (c)(1),
(2) Date: May 31, 2024

(87) PCT Pub. No.: WO2024/001694
PCT Pub. Date: Jan. 4, 2024

(65) Prior Publication Data

US 2025/0036696 A1 Jan. 30, 2025

(30) Foreign Application Priority Data

Jun. 27, 2022 (CN) ......................... 202210743437.9

(51) Int. Cl.
*G06F 16/9535* (2019.01)
*G06F 16/2457* (2019.01)
*G06F 16/9538* (2019.01)

(52) U.S. Cl.
CPC .... *G06F 16/9535* (2019.01); *G06F 16/24578* (2019.01); *G06F 16/9538* (2019.01)

(58) Field of Classification Search
CPC ........... G06F 16/9535; G06F 16/24578; G06F 16/9538
See application file for complete search history.

(56) References Cited

U.S. PATENT DOCUMENTS 7,058,624 B2 6/2006 Masters
8,560,398 B1 * 10/2013 Gregov .................. G06Q 30/06 705/26.7

(Continued)

FOREIGN PATENT DOCUMENTS

CN 108734446 A 11/2018
CN 109145210 A 1/2019

(Continued)

OTHER PUBLICATIONS

International Search Report and Written Opinion received for PCT Patent Application No. PCT/CN2023/098579, mailed on Jul. 24, 2023, 9 pages (2 pages of English Translation and 7 pages of Original Document).

(Continued)

*Primary Examiner* — Sherief Badawi
*Assistant Examiner* — Earl Levi Elias

(57) ABSTRACT

The present disclosure provides a data processing method, apparatus, device and storage medium, the method comprising: firstly, displaying at least one recommended content adjustment control on a recommended content adjustment page, wherein a recommended content label for identifying a content type recommended by a target application is presented on the recommended content adjustment control, and then, upon receiving a preset adjustment operation with respect to the target recommended content adjustment control, determining a recommendation strength value corresponding to the target recommended content adjustment control, wherein the recommendation strength value is used for adjusting a recommendation amount of the target application for the content type identified by the recommended content label corresponding to the target recommended content adjustment control.

8 Claims, 6 Drawing Sheets

(56) References Cited

U.S. PATENT DOCUMENTS

| | | | | |
|---|---|---|---|---|
| 9,305,084 | B1 * | 4/2016 | McCann | G06F 16/954 |
| 9,524,077 | B1 * | 12/2016 | Pattan | H04N 21/4312 |
| 2009/0055759 | A1 * | 2/2009 | Svendsen | H04L 65/403 715/764 |
| 2011/0295847 | A1 | 12/2011 | Cucerzan et al. | |
| 2012/0004954 | A1 * | 1/2012 | Eisinger | G06Q 30/0207 705/14.1 |
| 2012/0226711 | A1 * | 9/2012 | Lavine | G06F 16/338 707/769 |
| 2013/0097177 | A1 * | 4/2013 | Fan | G06F 16/438 707/805 |
| 2013/0326562 | A1 * | 12/2013 | Bi | H04N 21/4821 725/58 |
| 2019/0370345 | A1 * | 12/2019 | Katukuri | G06F 16/9535 |
| 2021/0297743 | A1 | 9/2021 | Miao | |

FOREIGN PATENT DOCUMENTS

| | | | |
|---|---|---|---|
| CN | 107273489 | B | 8/2019 |
| CN | 112579910 | A | 3/2021 |
| CN | 113157753 | A | 7/2021 |
| CN | 113609375 | A | 11/2021 |
| CN | 113988965 | A | 1/2022 |
| CN | 115129985 | A | 9/2022 |
| JP | 2005-039749 | A | 2/2005 |
| JP | 2008-152394 | A | 7/2008 |
| JP | 2014-119945 | A | 6/2014 |
| WO | 2020/007012 | A1 | 1/2020 |
| WO | 2020/007013 | A1 | 1/2020 |

OTHER PUBLICATIONS

Office action received from Chinese patent application No. 202210743437.9 mailed on Nov. 4, 2022, 10 pages (5 pages English Translation and 5 pages Original Copy).

European Search Report for EP Patent Application No. 23829878.0, Issued on Jun. 2, 2025, 8 pages.

Parra et al., "See what you want to see: visual user-driven approach for hybrid recommendation", IUI '14, Feb. 2014, pp. 235-240.

Office action received from Japanese patent application No. 2024-575123 mailed on Oct. 28, 2025, 11 pages (6 pages of English Translation and 5 pages of Original Document).

* cited by examiner

Figure 1:
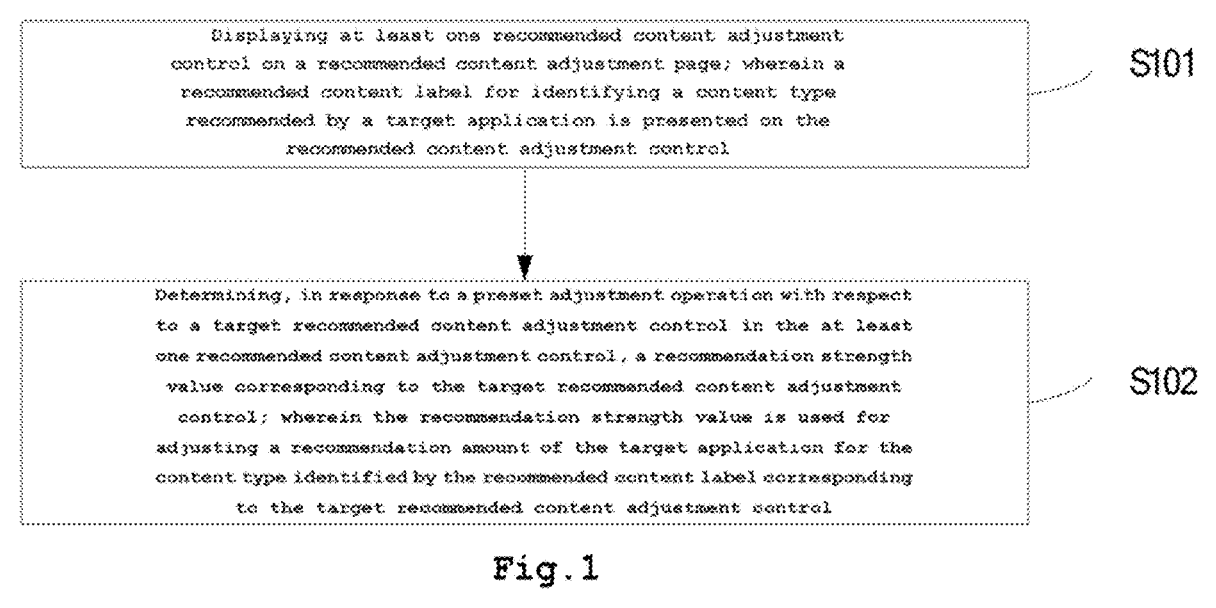

Displaying at least one recommended content adjustment control on a recommended content adjustment page; wherein a recommended content label for identifying a content type recommended by a target application is presented on the recommended content adjustment control

S101

Determining, in response to a preset adjustment operation with respect to a target recommended content adjustment control in the at least one recommended content adjustment control, a recommendation strength value corresponding to the target recommended content adjustment control; wherein the recommendation strength value is used for adjusting a recommendation amount of the target application for the content type identified by the recommended content label corresponding to the target recommended content adjustment control

DATA PROCESSING METHOD, APPARATUS, DEVICE AND STORAGE MEDIUM

CROSS REFERENCE TO RELATED APPLICATIONS

The present application is U.S. National Phase Application under 37 C.F.R. § 371 of International Patent Application No. PCT/CN2023/098579, filed Jun. 6, 2023, which claims priority to Chinese Patent Application No. 202210743437.9, filed Jun. 27, 2022, the disclosures of which are incorporated herein by reference in their entireties.

TECHNICAL FIELD

The present disclosure relates to the field of data processing, and in particular, to a data processing method, apparatus, device, and storage medium.

BACKGROUND

With development of Internet technology, a content recommendation function has been widely used in various applications.

SUMMARY

In order to solve the above technical problem, an embodiment of the present disclosure provides a data processing scheme.

In a first aspect, the present disclosure provides a data processing method, the method comprising:

displaying at least one recommended content adjustment control on a recommended content adjustment page; wherein a recommended content label is presented on the recommended content adjustment control, and the recommended content label is used for identifying a content type recommended by a target application;

in response to a preset adjustment operation with respect to a target recommended content adjustment control in the at least one recommended content adjustment control, determining a recommendation strength value corresponding to the target recommended content adjustment control; wherein the recommendation strength value is used for adjusting a recommendation amount of the target application for the content type identified by the recommended content label corresponding to the target recommended content adjustment control.

In some embodiments, a recommendation strength adjustment state corresponding to the recommended content label is further presented on the recommended content adjustment control, the recommendation strength adjustment state being used to represent a size relationship between a recommendation strength value corresponding to the recommended content label and a default recommendation strength value; after the determining the recommendation strength value corresponding to the target recommended content adjustment control, the method further comprises:

updating display of the recommendation strength adjustment state corresponding to the target recommended content adjustment control based on the recommendation strength value corresponding to the target recommended content adjustment control.

In some embodiments, the determining, in response to the preset adjustment operation with respect to the target recommended content adjustment control in the at least one recommended content adjustment control, the recommendation strength value corresponding to the target recommended content adjustment control comprises:

in response to the preset adjustment operation with respect to the target recommended content adjustment control in the at least one recommended content adjustment control, displaying a preset deletion control on the target recommended content adjustment control, and determining the recommendation strength value corresponding to the target recommended content adjustment control.

In some embodiments, the method further comprises:

in response to a triggering operation with respect to the preset deletion control on the target recommended content adjustment control, deleting the target recommended content adjustment control from the recommended content adjustment page.

In some embodiments, the deleting the target recommended content adjustment control from the recommended content adjustment page in response to the triggering operation with respect to the preset deletion control on the target recommended content adjustment control comprises:

in response to the triggering operation with respect to the preset deletion control on the target recommended content adjustment control, determining whether the target recommended content adjustment control is the last recommended content adjustment control on the recommended content adjustment page;

if it is determined that the target recommended content adjustment control is the last recommended content adjustment control on the recommended content adjustment page, updating display of the recommended content adjustment page based on a predetermined set of recommended content labels; wherein the set of recommended content labels comprises a preset number of recommended content labels.

In some embodiments, the method further comprises:

if it is determined that the number of the recommended content adjustment controls displayed on the recommended content adjustment page is not greater than a preset number threshold, displaying at least one optional adjustment control in a preset label recommendation area on the recommended content adjustment page; wherein a recommended content label is presented on the optional adjustment control;

in response to a preset adjustment operation with respect to a target optional adjustment control in the at least one optional adjustment control, determining a recommendation strength value corresponding to the target optional adjustment control; and adding the target optional adjustment control with the recommendation strength value to the recommended content adjustment control displayed on the recommended content adjustment page.

In some embodiments, a first control is further displayed on the recommended content adjustment page, and the method further comprises:

in response to a triggering operation with respect to the first control, displaying a content label page; wherein at least one recommended content label is displayed on the content label page; and in response to a preset selection operation with respect to the at least one recommended content label on the content label page, adding the at least one recommended content label to the recommended content adjustment page, and displaying, on the recommended content adjustment page, recommended content adjustment controls corresponding to the at least one recommended content label, respectively.

In some embodiments, the displaying, on the recommended content adjustment page, the recommended content adjustment controls corresponding to the at least one recommended content label, respectively, comprises:

displaying, on the recommended content adjustment page, the recommended content adjustment controls corresponding to the at least one recommended content label, respectively, in the form of a preset editing state.

In some embodiments, a second control is further displayed on the recommended content adjustment page; after the determining, in response to the preset adjustment operation with respect to the target recommended content adjustment control in the at least one recommended content adjustment control, the recommendation strength value corresponding to the target recommended content adjustment control, the method further comprises:

in response to a triggering operation with respect to the second control, storing a corresponding relation between the recommended content label corresponding to the target recommended content adjustment control and the recommendation strength value.

In some embodiments, the method further comprises:

in response to a display triggering operation with respect to the recommended content adjustment page, sequencing and displaying respective recommended content adjustment controls on the recommended content adjustment page based on the recommendation strength values of the recommended content labels corresponding to the respective recommended content adjustment controls on the recommended content adjustment page, respectively.

In a second aspect, the present disclosure provides a data processing apparatus, the apparatus comprising:

a first display module, configured to display at least one recommended content adjustment control on a recommended content adjustment page; wherein a recommended content label for identifying a content type recommended by a target application is presented on the recommended content adjustment control; and a first determining module, configured to determine, in response to a preset adjustment operation with respect to a target recommended content adjustment control in the at least one recommended content adjustment control, a recommendation strength value corresponding to the target recommended content adjustment control; wherein the recommendation strength value is used for adjusting a recommendation amount of the target application for the content type identified by the recommended content label corresponding to the target recommended content adjustment control.

In a third aspect, the present disclosure provides a computer-readable storage medium having stored therein instructions that, when run on a terminal device, cause the terminal device to implement the method described in the present disclosure.

In a fourth aspect, the present disclosure provides a data processing apparatus, comprising: a memory, and a processor, wherein a computer program executable on the processor is stored on the memory, which, when executed by the processor, implements the method described in the present disclosure.

In a fifth aspect, the present disclosure provides a computer program product comprising computer programs/instructions which, when executed by a processor, implement the method described in the present disclosure.

In a sixth aspect, the present disclosure provides a computer program comprising program code which, when executed by a processor, implements the method described in the present disclosure.

BRIEF DESCRIPTION OF THE DRAWINGS

The accompanying drawings here, which are incorporated in this description and constitute a part thereof, illustrate embodiments consistent with the present disclosure and, together with the description, serve to explain the principles of the present disclosure.

In order to more clearly illustrate the embodiments of the present disclosure or technical solutions in the prior art, the drawings used in the embodiments or for description of the prior art will be briefly described below, and it is obvious for one of ordinary skill in the art that other drawings can be obtained according to these drawings without inventive labor.

FIG. 1 is a flowchart of a data processing method provided in an embodiment of the present disclosure;

DETAILED DESCRIPTION

Figure 2:
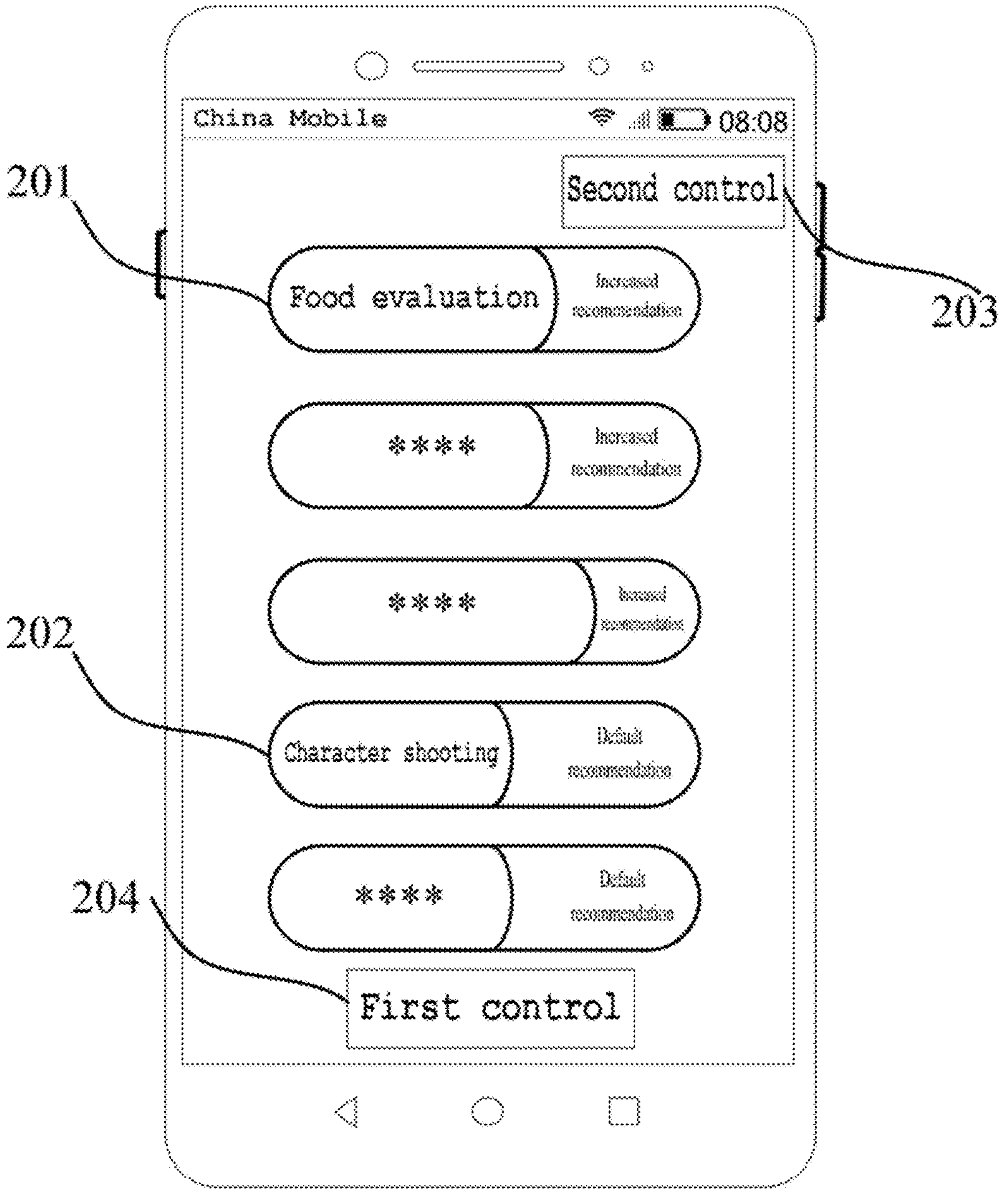
FIG. 2 is a schematic diagram of a recommended content adjustment page provided in an embodiment of the present disclosure.

In order to more clearly understand the above objectives, features and advantages of the present disclosure, solutions of the present disclosure will be further described below. It should be noted that, the embodiments of the present disclosure and features in the embodiments may be combined with each other without conflict.

In the following description, numerous specific details are set forth to facilitate a thorough understanding of the present disclosure, but the present disclosure may also be practiced in other ways different from those described here; and it is obvious that the embodiments in this description are only some of the embodiments of the present disclosure, rather than all of the embodiments.

The content recommendation function involved in the current application supports a single setting of a content type in which the user is interested. For example, for the same content type, such as a video of a travel type, only two recommendation manners may exist based on the content recommendation setting of the user, e.g., one manner is to recommend the video of the travel type to the user, and the other manner may be not to recommend the video of the travel type to the user. Therefore, the adjustment granularity of the content recommendation manner is coarse at present, which cannot meet the increasing demand of the user on content recommendation.

In view of the above, a data processing scheme is provided in an embodiment of the present disclosure. First, at least one recommended content adjustment control is displayed on a recommended content adjustment page, where a recommended content label is presented on the recommended content adjustment control, the recommended content label being used to identify a content type recommended by a target application. Then, when a preset adjustment operation with respect to the target recommended content adjustment control is received, a recommendation strength value corresponding to the target recommended content adjustment control is determined, wherein the recommendation strength value is used for adjusting a recommendation amount of the target application for the content type identified by the recommended content label corresponding to the target recommended content adjustment control.

Therefore, according to embodiments of the present disclosure, the recommendation strength value of the content type identified by the recommended content label corresponding to the target recommended content adjustment control is determined through a preset adjustment operation, so that the recommendation amount of each recommended content type can be adjusted in a finer granularity, which meets the increasing demand of the user on content recommendation.

On this basis, an embodiment of the present disclosure provides a data processing method. Referring to FIG. 1, which is a flowchart of the data processing method provided in an embodiment of the present disclosure, the method comprises:

S101: displaying at least one recommended content adjustment control on a recommended content adjustment page.

A recommended content label is presented on the recommended content adjustment control, the recommended content label being used for identifying a content type recommended by a target application.

In an embodiment of the present disclosure, the target application may be an application of content recommendation, such as a video recommendation application, a news application, a music application, and the like.

In an embodiment of the present disclosure, the recommended content adjustment control is used to adjust a recommendation amount of the content type identified by the corresponding recommended content label. The recommended content adjustment control can be in the form of a stepless sliding rod, and an adjustment of the recommendation amount of the content type is achieved by controlling a sliding position of the stepless sliding rod. Information such as icons and words of corresponding recommended content labels can be presented on the recommended content adjustment control.

FIG. 2 is a schematic diagram of a recommended content adjustment page provided in an embodiment of the present disclosure, where a plurality of recommended content adjustment controls are displayed on the recommended content adjustment page, and taking the recommended content adjustment control 201 as an example, a recommended content label "food evaluation" is presented on the recommended content adjustment control 201, where the "food evaluation" is used to identify a content type of evaluated food recommended by a target application.

In some embodiments, a recommendation strength adjustment state corresponding to the recommended content label is further presented on the recommended content adjustment control, and the recommendation strength adjustment state is used to represent a size relationship between the recommendation strength value corresponding to the recommended content label and a default recommendation strength value.

In some embodiments, the recommendation strength adjustment states may include three adjustment states, namely, an increased recommendation, a default recommendation, and a decreased recommendation. The increased recommendation is used to represent an adjustment state of being greater than the default recommendation strength value, which indicates the target application needs to increase the recommendation amount with respect to the content type corresponding to the recommended content label with the "increased recommendation" adjustment state; the decreased recommendation is used to represent an adjustment state of being less than the default recommendation strength value, which indicates the target application needs to decrease the recommendation amount with respect to the content type corresponding to the recommended content label with the "decreased recommendation" adjustment state; and the default recommendation represents an adjustment state of being equal to the default recommendation strength value, that is, recommended content labels whose recommendation strength is not adjusted by the user may all display an adjustment state of the default recommendation, which indicates that the target application does not need to adjust the recommendation amount with respect to the content type corresponding to the recommended content label with the "default recommendation" adjustment state.

In other embodiments, the recommendation strength adjustment states may include five adjustment states, namely, a strongly increased recommendation, an increased recommendation, a default recommendation, a decreased recommendation, and no recommendation, where the strongly increased recommendation is used to represent an adjustment state of being greater than the default recommendation strength value to a great extent, which indicates the target application needs to increase the recommendation amount to a great extent with respect to the content type corresponding to the recommended content label with the "strongly increased recommendation" adjustment state; and no recommendation is used to represent an adjustment state with a recommendation strength value of 0, which indicates the target application needs to prohibit recommendation with respect to the content type corresponding to the recommended content label with the "no recommendation" adjustment state. For other adjustment states, please specifically refer to the above understandings.

It should be noted that the recommendation strength adjustment state corresponding to the recommended content label is determined based on a size relationship between the recommendation strength value of the recommended content label and a default recommendation strength value. Specifically, a specific type of adjustment state included in the recommendation strength adjustment states is not limited to the above.

As shown in the above-described FIG. 2, a recommended content label "food evaluation" is presented on the recommended content adjustment control 201, and the corresponding recommendation strength adjustment state is "increased recommendation", representing the target application needs to increase the recommendation amount with respect to the content type of "food evaluation". In addition, a recommended content label "character shooting" is presented on a recommended content adjustment control 202 shown in FIG.

2, and the corresponding recommendation strength adjustment state is "default recommendation", indicating the target application does not need to adjust the recommendation amount with respect to the content type of "character shooting".

S102: in response to a preset adjustment operation with respect to a target recommended content adjustment control in the at least one recommended content adjustment control, determining a recommendation strength value corresponding to the target recommended content adjustment control.

The recommendation strength value is used for adjusting a recommendation amount of the target application for the content type identified by the recommended content label corresponding to the target recommended content adjustment control.

In an embodiment of the disclosure, the user may adjust the recommendation strength with respect to at least one recommended content adjustment control displayed on the recommended content adjustment page. The target recommended content adjustment control can be any recommended content adjustment control displayed on the recommended content adjustment page.

When a preset adjustment operation with respect to the target recommended content adjustment control is received, a recommendation strength value corresponding to the target recommended content adjustment control, namely a recommendation strength value corresponding to a recommended content label displayed on the target recommended content adjustment control, is determined based on the preset adjustment operation.

In some embodiments, the preset adjustment operation may be a sliding operation with respect to the target recommended content adjustment control, or the preset adjustment operation may be an operation combination in which the target recommended content adjustment control is clicked first, and then a sliding operation is triggered with respect to the target recommended content adjustment control. The embodiments in the present disclosure do not set limitations thereon.

As shown in FIG. 2, the user may adjust the recommendation strength value corresponding to the target recommended content adjustment control by sliding the target recommended content adjustment control. Specifically, sliding to the right may increase the recommendation strength value, while sliding to the left may decrease the recommendation strength value. Assuming the style of the target recommended content adjustment control is a stepless slide rod, the recommendation strength value corresponding to the target recommended content adjustment control can be adjusted by controlling slide of the stepless slide rod.

In some embodiments, the user may adjust the recommendation strength values with respect to at least one recommended content adjustment control displayed on the recommended content adjustment page, respectively, so as to determine a recommendation strength value corresponding to each of the at least one recommended content adjustment controls, which is used to adjust a recommendation amount of the target application for the content type identified by the corresponding recommended content label.

In some embodiments, a second control 203 is also displayed on the recommended content adjustment page. As shown in the above-described FIG. 2, the second control 203 is used to trigger saving of the adjusted recommendation strength value. In particular, the second control 203 may be a "finish" control. After the user clicks the "finish" control, storage of a corresponding relationship between the recommended content label corresponding to each of the adjusted recommended content adjustment controls on the recommended content adjustment page the recommendation strength value may be triggered.

Specifically, when a triggering operation for the second control is received, the corresponding relationship between the recommended content label corresponding to the target recommended content adjustment control and the recommendation strength value is stored, so as to be subsequently applied to the content recommendation strategy of the target application.

In some embodiments, after the triggering operation for the second control is received, the corresponding relationship between the recommended content label corresponding to the target recommended content adjustment control and the recommendation strength value may be stored, and in addition, the recommended content adjustment controls corresponding to the respective recommended content labels are sorted based on the recommendation strength values corresponding to the recommended content labels, respectively, and then display of the recommended content adjustment page is updated based on the sorted recommended content adjustment controls.

In other embodiments, after the triggering operation for the second control is received, the corresponding relationship between the recommended content label corresponding to the target recommended content adjustment control and the recommendation strength value may be saved, and the recommended content adjustment page is closed. Then, when a display triggering operation with respect to the recommended content adjustment page is received (that is, the recommended content adjustment page is entered again), based on the recommendation strength values of the recommended labels corresponding to the recommended content adjustment controls, respectively, the recommended content adjustment controls are displayed in a sorted manner on the recommended content adjustment page.

In some embodiments, the recommended content adjustment controls may be sorted and displayed in descending order based on a descending order of the recommendation strength values, so that the user can learn the content type, proportion, and the like subsequently recommended by the target application for him/her.

In the data processing method provided by embodiments of the present disclosure, first, at least one recommended content adjustment control is displayed on a recommended content adjustment page, where a recommended content label is presented on the recommended content adjustment control, and the recommended content label is used for identifying a content type recommended by a target application. Then, when a preset adjustment operation for the target recommended content adjustment control is received, a recommendation strength value corresponding to the target recommended content adjustment control is determined, where the recommendation strength value is used for adjusting the recommendation amount of the target application for the content type identified by the recommended content label corresponding to the target recommended content adjustment control. Therefore, in embodiments of the present disclosure, the recommendation strength value of the content type identified by the recommended content label corresponding to the target recommended content adjustment control is determined through a preset adjustment operation, so that the recommendation amount of each recommended content type can be adjusted in a finer granularity, which meets the increasing demand of the user on content recommendation.

Additionally or alternatively, embodiments of the present disclosure may also delete a recommended content adjustment control displayed on the recommended content adjustment page, so as to meet a demand on removal of a recommended content label for which the recommendation amount adjustment is not interested by the user.

Specifically, in response to a preset adjustment operation of a target recommended content adjustment control in at least one recommended content adjustment control on the recommended content adjustment page, a preset deletion control is displayed on the target recommended content adjustment control, and a recommendation strength value corresponding to the target recommended content adjustment control is determined.

Figure 3:
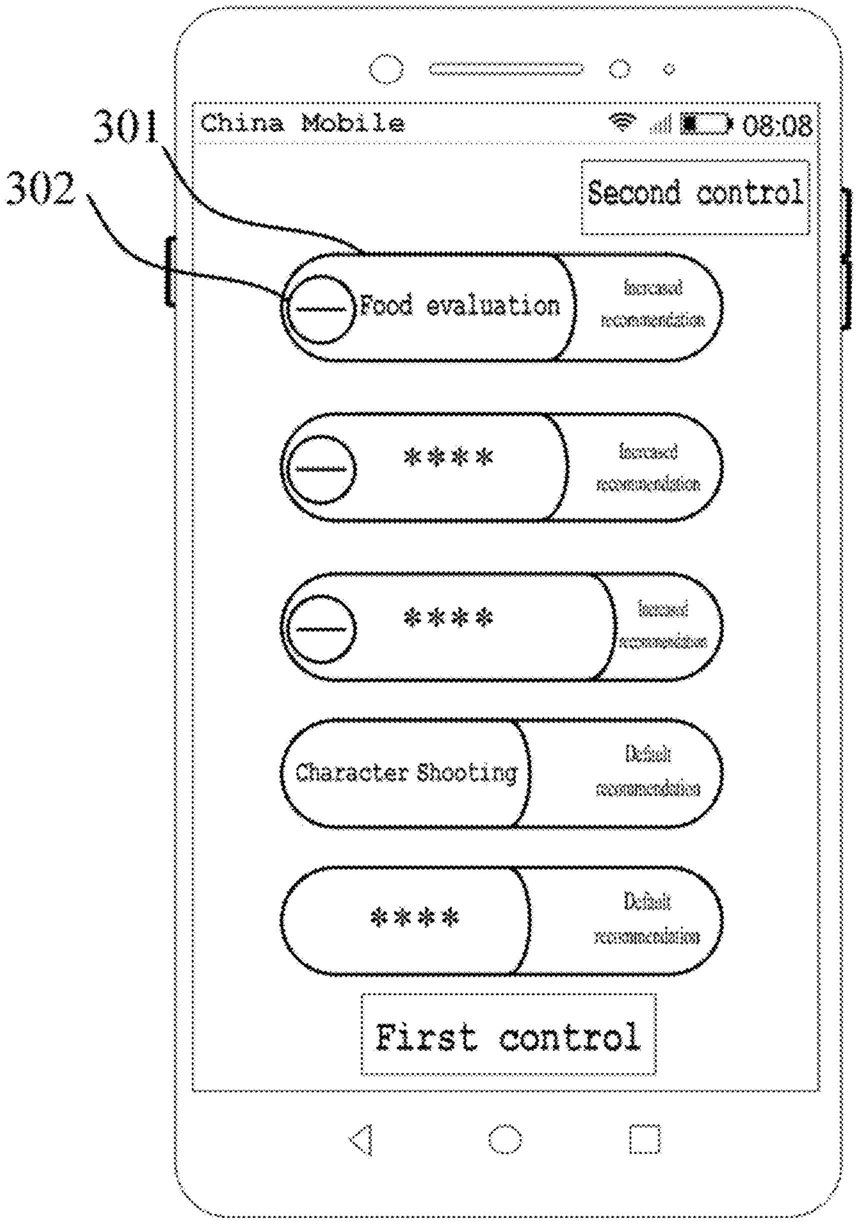
FIG. 3 is a schematic diagram of another recommended content adjustment page provided by an embodiment of the present disclosure.

In some embodiments, when a user triggers a sliding operation with respect to a target recommended content adjustment control, a preset deletion control may be displayed on the target recommended content adjustment control, as shown in FIG. 3, which is a schematic diagram of another recommended content adjustment page provided in an embodiment of the present disclosure, where when a sliding operation is triggered with respect to a recommended content adjustment control 301 corresponding to a recommended content label "food evaluation", display of a preset deletion control 302 on the recommended content adjustment control 301 is triggered, so as to implement a deletion operation on the recommended content adjustment control 301. Meanwhile, with the sliding operation triggered with respect to the recommended content adjustment control 301 corresponding to the recommended content label "food evaluation", the recommendation strength value corresponding to the target recommended content adjustment control can be determined, and display of the recommendation strength adjustment state corresponding to the target recommended content adjustment control is updated.

In some embodiments, when a triggering operation for a preset deletion control on a target recommended content adjustment control is received, the target recommended content adjustment control is deleted from the recommended content adjustment page, and a recommended content label corresponding to the target recommended content adjustment control is removed.

In some embodiments, when a triggering operation for the preset deletion control on the target recommended content adjustment control is received, it may be first determined whether the target recommended content adjustment control is the last recommended content adjustment control on the recommended content adjustment page. If it is determined that the target recommended content adjustment control is the last recommended content adjustment control on the recommended content adjustment page, display of the recommended content adjustment page can be updated based on a predetermined set of recommended content labels; the set of recommended content labels comprises a preset number of recommended content labels.

In practical applications, the recommended content labels in the set of recommended content labels may be predetermined recommended content labels in which the current user is interested, and the recommendation strength value corresponding to each recommended content label is equal to the default strength value. When the user deletes the last recommended content adjustment control on the recommended content adjustment page, display of the recommended content adjustment control corresponding to the recommended content label in the set of recommended content labels can be triggered, so that the user can continuously adjust the recommendation strength value of the recommended content label of interest.

In addition, when the user deletes the last recommended content adjustment control on the recommended content adjustment page, a confirmation popup may be displayed on the recommended content adjustment page, so that the user may confirm the deletion operation of the last recommended content adjustment control based on the confirmation popup.

In an embodiment of the present disclosure, if it is determined that the number of recommended content adjustment controls displayed on the recommended content adjustment page is not greater than a preset number threshold, at least one optional adjustment control is displayed in a preset label recommendation area on the recommended content adjustment page, where a recommended content label is presented on the optional adjustment control. In response to a preset adjustment operation with respect to a target optional adjustment control in the at least one optional adjustment control, a recommendation strength value corresponding to the target optional adjustment control is determined, and then the target optional adjustment control with the recommendation strength value is added to the recommended content adjustment control displayed on the recommended content adjustment page.

The preset number threshold may be determined based on demands. For example, the preset number threshold may be 3.

Figure 4:
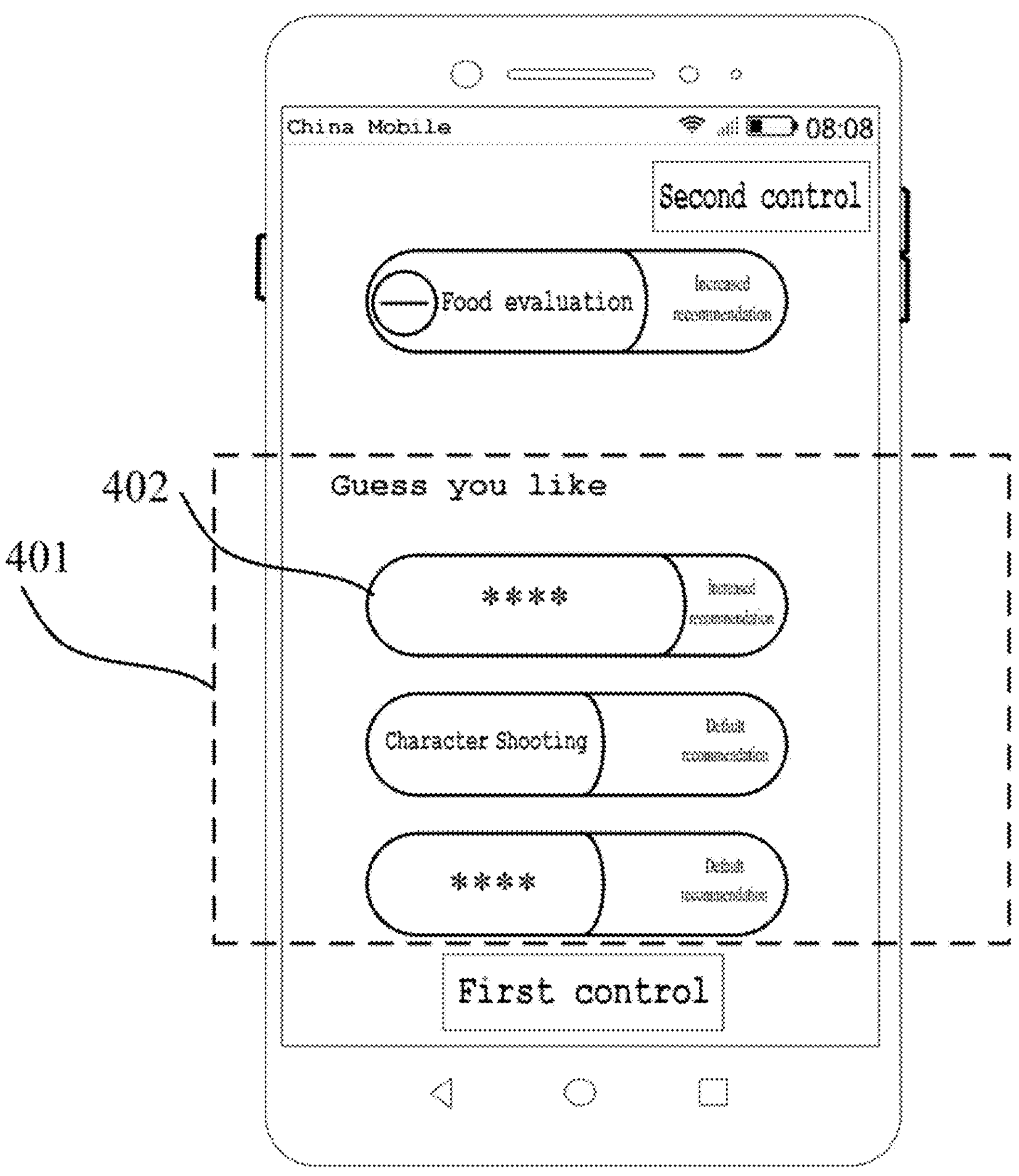
FIG. 4 is a schematic diagram of a further recommended content adjustment page provided by an embodiment of the present disclosure.

In practical applications, if it is determined that the number of the recommended content adjustment controls displayed on the recommended content adjustment page is not greater than the preset number threshold, it indicates that the number of the recommended content adjustment controls displayed on the recommended content adjustment page is too small, and more recommended content labels can be recommended for the user to be adjusted by the user for the recommendation strength value. To this end, in an embodiment of the present disclosure, at least one optional adjustment control is displayed in a preset label recommendation area on the recommended content adjustment page, as shown in FIG. 4, which is a schematic diagram of another recommended content adjustment page provided in an embodiment of the present disclosure, where a preset label recommendation area 401 is displayed on the recommended content adjustment page, and at least one optional adjustment control, including an optional adjustment control 402, is displayed in the preset label recommendation area 401. Specifically, a recommended content label, a recommendation strength adjustment state, an icon, and the like are displayed on the optional adjustment control 402.

For the optional adjustment control 402 in the preset label recommendation area 401, the user may adjust the recommendation strength value of the optional adjustment control 402 in the area, so as to update display of the corresponding recommendation strength adjustment state. After the user clicks the second control on the recommended content adjustment page, storage of a corresponding relation between the optional adjustment control 402 and the recommendation strength value is triggered, and meanwhile, the optional adjustment control 402 is added to the recommended content adjustment control displayed on the recommended content adjustment page.

If it is determined at this time that the number of recommended content adjustment controls displayed on the recommended content adjustment page is still not greater than a preset number threshold, optional adjustment controls continue to be displayed in the preset label recommendation area 401. Specifically, the number of optional adjustment controls in the preset label recommendation area 401 may be a preset number threshold, and when the number of the optional adjustment controls in the preset label recommendation area 401 is less than the preset number threshold, the number of the optional adjustment controls displayed may be complemented.

In the data processing method provided by an embodiment of the present disclosure, a recommended content adjustment control displayed on the recommended content adjustment page can be deleted and added, so that the user can determine the recommended content label in which the user is interested, thereby adjusting the recommendation strength value of the recommended content in which the user is interested, and improving the use experience of the user.

Additionally or alternatively, a first control is further displayed on the recommended content adjustment page in the data processing method provided by embodiments of the present disclosure, and specifically, when a triggering operation for the first control is received, a content label page is displayed; where at least one recommended content label is displayed on the content label page. Then, in response to a preset selection operation with respect to at least one recommended content label on the content label page, the at least one recommended content label is added to the recommended content adjustment page, and recommended content adjustment controls corresponding to the at least one recommended content label, respectively, are displayed on the recommended content adjustment page.

Figure 5:
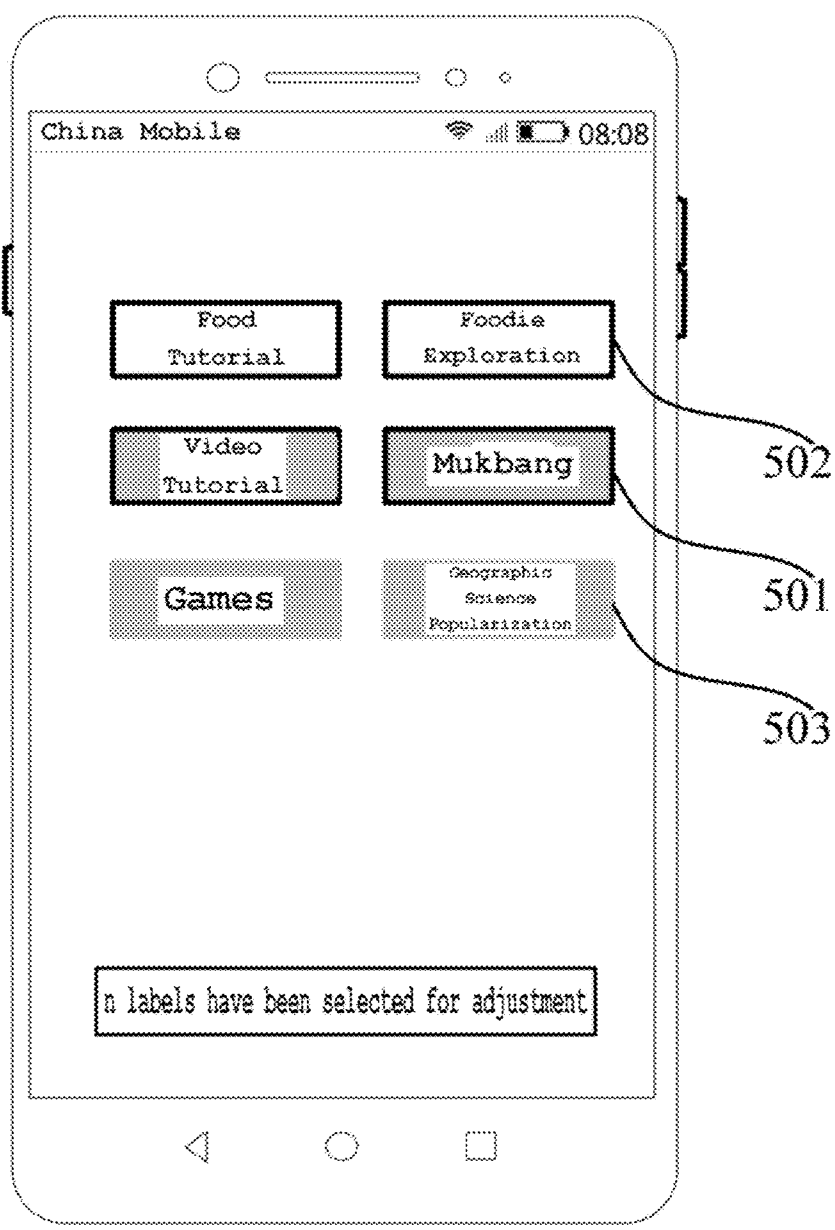
FIG. 5 is a schematic diagram of a content label page provided by an embodiment of the present disclosure.

As shown in FIG. 2, a first control 204 is further displayed on the recommended content adjustment page, and when a triggering operation for the first control 204 is received, the recommended content adjustment page jumps to the content label page. As shown in FIG. 5, which is a schematic diagram of a content label page provided by an embodiment of the present disclosure, a plurality of recommended content labels are displayed on the content label page, and the recommended content labels may include three states, specifically, "selected" 501, "unselected" 502, and "non-selectable" 503, where a recommended content label in the state of "non-selectable" 503 refers to a recommended content label already on the recommended content adjustment page.

The user may select a recommended content label on the content label page, and in response to a preset selection operation with respect to the selected recommended content label on the content label page, add the selected recommended content label to the recommended content adjustment page, and display recommended content adjustment controls respectively corresponding to the selected recommended content labels on the recommended content adjustment page.

In some embodiments, after the selected recommended content label is added to the recommended content adjustment page, recommended content adjustment controls respectively corresponding to the selected at least one recommended content label may be displayed in the form of a preset editing state on the recommended content adjustment page.

Specifically, a preset deletion control may be presented on the recommended content adjustment control corresponding to the selected recommended content label, and a user may drag the recommended content adjustment control to adjust the recommendation strength value.

According to the data processing method provided by embodiments of the present disclosure, a new recommended content adjustment control can be added from the content label page to the recommended content adjustment page, so that a user can select an interested recommended content label, thereby adjusting the recommendation strength value of the interested recommended content, and improving the use experience of the user.

Figure 6:
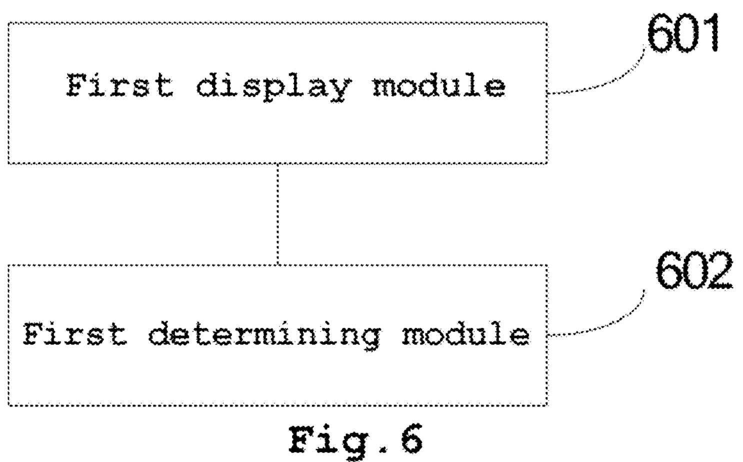
FIG. 6 is a schematic structural diagram of a data processing apparatus provided by an embodiment of the present disclosure.

The present disclosure further provides a data processing apparatus. Referring to FIG. 6, which is a schematic structural diagram of a data processing apparatus provided in an embodiment of the present disclosure, where the apparatus comprises:

a first display module 601, configured to display at least one recommended content adjustment control on a recommended content adjustment page; where a recommended content label is presented on the recommended content adjustment control, and the recommended content label is used for identifying a content type recommended by a target application; and a first determining module 602, configured to determine, in response to a preset adjustment operation with respect to a target recommended content adjustment control in the at least one recommended content adjustment control, a recommendation strength value corresponding to the target recommended content adjustment control; where the recommendation strength value is used for adjusting a recommendation amount of the target application for the content type identified by the recommended content label corresponding to the target recommended content adjustment control.

In some embodiments, a recommendation strength adjustment state corresponding to the recommended content label is further presented on the recommended content adjustment control, and the recommendation strength adjustment state is used to represent a size relationship between the recommendation strength value corresponding to the recommended content label and a default recommendation strength value; the apparatus further comprises:

a display updating module, configured to update display of the recommendation strength adjustment state corresponding to the target recommended content adjustment control based on the recommendation strength value corresponding to the target recommended content adjustment control.

In some embodiments, the first determining module is further configured to:

display, in response to the preset adjustment operation with respect to the target recommended content adjustment control in the at least one recommended content adjustment control, a preset deletion control on the target recommended content adjustment control, and determine a recommendation strength value corresponding to the target recommended content adjustment control.

In some embodiments, the apparatus further comprises:

a deleting module, configured to delete, in response to a triggering operation with respect to the preset deletion control on the target recommended content adjustment control, the target recommended content adjustment control from the recommended content adjustment page.

In some embodiments, the deleting module comprises:

a first determining sub-module, configured to determine, in response to the triggering operation of the preset deletion control on the target recommended content adjustment control, whether the target recommended content adjustment control is the last recommended content adjustment control on the recommended content adjustment page; and a first display updating sub-module, configured to, if it is determined that the target recommended content adjustment control is the last recommended content adjustment control on the recommended content adjustment page, update display of the recommended content adjustment page based on a predetermined set of recommended content labels; wherein the set of recommended content labels comprises a preset number of recommended content labels.

In some embodiments, the apparatus further comprises:

a second display module, configured to display at least one optional adjustment control in a preset label recommendation area on the recommended content adjustment page if it is determined that the number of recommended content adjustment controls displayed on the recommended content adjustment page is not greater than a preset number threshold; wherein a recommended content label is presented on the optional adjustment control;

a second determining module, configured to determine, in response to a preset adjustment operation with respect to a target optional adjustment control in the at least one optional adjustment control, a recommendation strength value corresponding to the target optional adjustment control; and an adding module, configured to add the target optional adjustment control with the recommendation strength value to the recommended content adjustment control on the displayed recommended content adjustment page.

In some embodiments, a first control is further displayed on the recommended content adjustment page, and the apparatus further comprises:

a third display module, configured to display, in response to a triggering operation with respect to the first control, a content label page; wherein at least one recommended content label is displayed on the content label page;

an adding module, configured to add, in response to a preset selection operation with respect to at least one recommended content label on the content label page, the at least one recommended content label to the recommended content adjustment page; and a fourth display module, configured to display recommended content adjustment controls respectively corresponding to the at least one recommended content label on the recommended content adjustment page.

In some embodiments, the fourth display module may be further operable to:

display recommended content adjustment controls respectively corresponding to the at least one recommended content label in the form of a preset editing state on the recommended content adjustment page.

In some embodiments, a second control is further displayed on the recommended content adjustment page; the apparatus further comprises:

a storage module, configured to store, in response to a triggering operation with respect to the second control, a corresponding relation between the recommended content label corresponding to the target recommended content adjustment control and the recommendation strength value.

In some embodiments, the apparatus further comprises:

a sequencing and displaying module, configured to sequence and display, in response to a display triggering operation with respect to the recommended content adjustment page, respective recommended content adjustment controls on the recommended content adjustment page based on the recommendation strength values of the recommended content labels corresponding to the respective recommended content adjustment controls on the recommended content adjustment page, respectively.

It should be noted that the above modules are only logic modules divided according to the specific functions implemented by the modules, and are not used to limit the specific implementation manner, but instead, may be implemented in software, hardware or a combination of software and hardware, for example. In actual implementation, the above modules may be implemented as independent physical entities, or may also be implemented by a single entity (for example, a processor (CPU or DSP, etc.), an integrated circuit, etc.). Furthermore, the various modules described above are shown in dashed lines in the figures to indicate that these modules may not actually be present, but that the operations/functions they implement may be implemented by the apparatus or the processing circuitry itself.

In the data processing apparatus provided by embodiments of the disclosure, at least one recommended content adjustment control is displayed on a recommended content adjustment page, where a recommended content label is presented on the recommended content adjustment control, and the recommended content label is used to identify a content type recommended by a target application. Then, when a preset adjustment operation with respect to the target recommended content adjustment control is received, a recommendation strength value corresponding to the target recommended content adjustment control is determined, wherein the recommendation strength value a is used for adjusting recommendation amount of the target application for the content type identified by the recommended content label corresponding to the target recommended content adjustment control. Therefore, according to embodiments of the disclosure, the recommendation strength value of the content type identified by the recommended content label corresponding to the target recommended content adjustment control is determined through the preset adjustment operation, so that the recommendation amount of each recommended content type can be adjusted in a finer granularity, which meets the increasing demand of the user on content recommendation.

In addition to the above method and the apparatus, an embodiment of the present disclosure further provides a computer-readable storage medium, storing instructions thereon, which, when run on a terminal device, cause the terminal device to implement the data processing method according to the embodiments of the present disclosure.

An embodiment of the present disclosure also provides a computer program product, comprising computer programs/instructions, which, when executed by a processor, implement the data processing method according to the embodiments of the present disclosure.

An embodiment of the present disclosure further provides a data processing device, comprising a memory and a processor, wherein computer programs are stored on the memory, which, when executed by the processor, implement the data processing method according to the embodiments of the present disclosure.

An embodiment of the present disclosure also provides a computer program, comprising program code, which, when executed by a processor, implements the data processing method according to the embodiments of the present disclosure.

Figure 7:
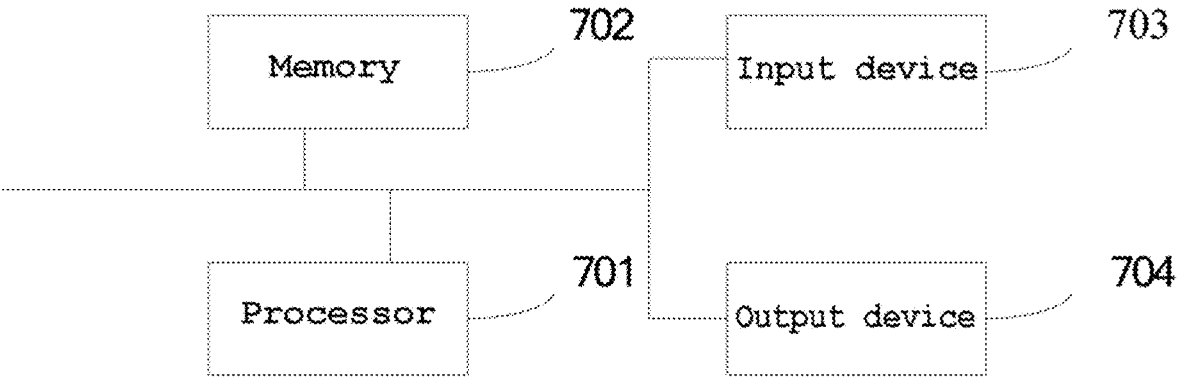
FIG. 7 is a schematic structural diagram of a data processing device provided by an embodiment of the present disclosure.

In addition, an embodiment of the present disclosure also provides a data processing device in which the data processing scheme according to the embodiments of the present disclosure can be implemented. Referring to FIG. 7, the data processing device may comprise:

a processor 701, a memory 702, an input device 703, and an output device 704. The number of processors 701 in the data processing device may be one or more, and one processor is taken as an example in FIG. 7. In some embodiments of the present disclosure, the processor 701, the memory 702, the input device 703 and the output device 704 may be connected by a bus or other means, wherein the connection by a bus is exemplified in FIG. 7.

The memory 702 may be used to store software programs and modules, and the processor 701 executes various functional applications and data processing of the data processing device by operating the software programs and modules stored in the memory 702. The memory 702 may mainly include a program storage area and a data storage area, wherein the program storage area may store an operating system, an application required for at least one function, and the like. Further, the memory 702 may include a cache, and may also include a non-volatile memory, such as at least one magnetic disk storage device, a flash memory device, or other volatile solid-state storage devices. The input device 703 may be used to receive input numeric or character information and to generate signal inputs relating to user settings and function control of the data processing device.

Specifically, in this embodiment, the processor 701 loads an executable file corresponding to a process of one or more applications into the memory 702 according to the following instructions, and the processor 701 runs the applications stored in the memory 702, thereby implementing various functions of the above data processing device.

It is to be noted that, in this text, relational terms such as “first” and “second” are used solely to distinguish one entity or operation from another entity or operation without necessarily requiring or implying any actual relationship or order between such entities or operations. Also, the terms “comprising”, “including” or any other variations thereof, are intended to cover a non-exclusive inclusion, such that a process, method, article, or device that comprises a list of elements does not include only those elements but may include other elements not expressly listed or elements inherent to such process, method, article, or device. Without further limitations, an element defined by the phrase “comprising an . . . ” does not exclude the presence of other identical elements in the process, method, article, or device that comprises the element.

The above description is only for the purpose of describing particular embodiments of the present disclosure, so as to enable those skilled in the art to understand or implement the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be conform to the widest scope consistent with the principles and novel features disclosed herein.

What is claimed is:

1. A data processing method of adjusting recommendation amount for at least one content type by a target application, the method comprising:

displaying, via a graphical user interface (GUI) of the target application, at least one recommended content adjustment user interface (UI) control on a recommended content adjustment page, wherein a recommended content label for identifying a content type recommended by a target application is presented on the at least one recommended content adjustment UI control;

receiving, via the GUI, a preset adjustment operation with respect to a target recommended content adjustment UI control of the at least one recommended content adjustment UI control displayed on the recommended content adjustment page;

in response to receiving, via the GUI, the preset adjustment operation with respect to the target recommended content adjustment UI control of the at least one recommended content adjustment UI control displayed on the recommended content adjustment page, displaying a preset deletion control on the target recommended content adjustment UI control, and determining a recommendation strength value corresponding to the target recommended content adjustment UI control; and based on the recommendation strength value, adjusting a recommendation amount of the target application for the content type identified by the recommended content label corresponding to the target recommended content adjustment UI control, wherein an adjustment indicator corresponding to the recommended content label is displayed on the recommended content adjustment UI control, the adjustment indicator indicating a comparative relationship between the recommendation strength value and a default recommendation strength value, which both correspond to the recommended content label, wherein after the determining the recommendation strength value corresponding to the target recommended content adjustment UI control, the method further comprises:

via the GUI, updating the adjustment indicator corresponding to the target recommended content adjustment UI control based on the recommendation strength value corresponding to the target recommended content adjustment UI control, the method further comprising:

receiving a triggering operation with respect to the preset deletion control on the target recommended content adjustment UI control;

in response to receiving the triggering operation with respect to the preset deletion control on the target recommended content adjustment UI control, deleting the target recommended content adjustment UI control from the recommended content adjustment page;

wherein the deleting the target recommended content adjustment UI control from the recommended content adjustment page in response to the triggering operation with respect to the preset deletion control on the target recommended content adjustment UI control comprises:

in response to the triggering operation with respect to the preset deletion control on the target recommended content adjustment UI control, determining whether the target recommended content adjustment UI control is the last recommended content adjustment UI control on the recommended content adjustment page; and in response to determining that the target recommended content adjustment UI control is the last recommended content adjustment UI control on the recommended content adjustment page, updating display of the recommended content adjustment page based on a predetermined set of recommended content labels, wherein the set of recommended content labels comprises a preset number of recommended content labels.

2. The method according to claim 1, the method further comprising:

if it is determined that the number of the recommended content adjustment UI controls displayed on the recommended content adjustment page is not greater than a preset number threshold, displaying at least one optional adjustment control in a preset label recommendation area on the recommended content adjustment page, wherein a recommended content label is presented on the optional adjustment control;

in response to a preset adjustment operation with respect to a target optional adjustment control of the at least one optional adjustment control displayed in the preset label recommendation area, determining a recommendation strength value corresponding to the target optional adjustment control; and adding the target optional adjustment control with the recommendation strength value to the recommended content adjustment UI control displayed on the recommended content adjustment page.

3. The method according to claim 1, wherein a first control is displayed on the recommended content adjustment page, the method further comprising:

displaying a content label page in response to a triggering operation with respect to the first control, wherein at least one recommended content label is displayed on the content label page; and in response to a preset selection operation with respect to the at least one recommended content label on the content label page, adding the at least one recommended content label to the recommended content adjustment page, and displaying, on the recommended content adjustment page, recommended content adjustment UI controls corresponding to the at least one recommended content label, respectively.

4. The method according to claim 3, wherein the displaying, on the recommended content adjustment page, the recommended content adjustment UI controls corresponding to the at least one recommended content label, respectively, comprises:

displaying, on the recommended content adjustment page, the recommended content adjustment UI controls corresponding to the at least one recommended content label, respectively, in the form of a preset editing state.

5. The method according to claim 1, wherein a second control is displayed on the recommended content adjustment page, and wherein after the determining, in response to the preset adjustment operation with respect to the target recommended content adjustment UI control in the at least one recommended content adjustment UI control, the recommendation strength value corresponding to the target recommended content adjustment UI control, the method further comprises:

in response to a triggering operation with respect to the second control, storing a corresponding relation between the recommended content label corresponding to the target recommended content adjustment UI control and the recommendation strength value.

6. The method according to claim 5, further comprising: in response to a display triggering operation with respect to the recommended content adjustment page, sequencing and displaying respective recommended content adjustment UI controls on the recommended content adjustment page based on the recommendation strength values of the recommended content labels corresponding to the respective recommended content adjustment UI controls on the recommended content adjustment page, respectively.

7. A computer-readable storage medium having stored thereon instructions which, when run on a terminal device, cause the terminal device to implement the method according to claim 1.

8. A data processing device, comprising: a memory, and a processor, wherein a computer program is stored on the memory, which, when executed by the processor, causes the processor to implement the method according to claim 1.

* * * * *